US005726818A

United States Patent [19]
Reed et al.

[11] Patent Number: 5,726,818
[45] Date of Patent: Mar. 10, 1998

[54] MAGNETIC DISK SAMPLED AMPLITUDE READ CHANNEL EMPLOYING INTERPOLATED TIMING RECOVERY FOR SYNCHRONOUS DETECTION OF EMBEDDED SERVO DATA

[75] Inventors: David E. Reed, Westminster; William G. Bliss, Thornton, both of Colo.

[73] Assignee: Cirrus Logic, Inc., Fremont, Calif.

[21] Appl. No.: 567,681

[22] Filed: Dec. 5, 1995

[51] Int. Cl.$^6$ .................................................. G11B 5/09
[52] U.S. Cl. ................................. 360/51; 360/77.08
[58] Field of Search ........................ 360/46, 48, 51, 360/77.08; 369/32, 59; 331/25; 340/146.2; 341/59; 364/602, 724.01, 724.1; 370/290; 375/354, 376, 340; 380/49

[56] References Cited

U.S. PATENT DOCUMENTS

| | | | |
|---|---|---|---|
| 4,866,647 | 9/1989 | Farrow | 364/724.1 |
| 5,127,051 | 6/1992 | Chan et al. | 380/49 |
| 5,177,734 | 1/1993 | Cummiskey et al. | 370/290 |
| 5,235,534 | 8/1993 | Potter | 364/724.01 |
| 5,255,131 | 10/1993 | Coker et al. | 360/48 |
| 5,258,933 | 11/1993 | Johnson et al. | 364/602 |
| 5,293,369 | 3/1994 | Melas et al. | 369/59 |
| 5,295,128 | 3/1994 | Hutchins et al. | 369/59 |
| 5,309,484 | 5/1994 | McLane et al. | 375/354 |

(List continued on next page.)

OTHER PUBLICATIONS

Ronald E. Crochiere and Lawrence R. Rabiner, *Multirate Digitasl Signal Processing*, 1983, Prentice Hall, pp. 127–192.

U.S. patent application Ser. No. 08/440,508 filed May 12, 1995, for: "Sampled Amplitude Read Channel Employing Interpolated Timing Recovery".

C.M Melas, P. Sutardja, "An Asynchronous Fully Digital Channel For Magnetic Recording", *IEEE Globecom* '94, vol. 2 of 3, pp. 1144–1147, 1994.

Chi-Tsong Chen, *Linear System Theory and Design*, Holt, Rinehart and Winston, 1984, pp. 569–570.

Floyd M. Gardner, "Interpolation in Digital Modems—Part I: Fundamentals", *IEEE Transactions on Communications*, vol. 41, No. 3, Mar. 1993.

Floyd M. Gardner, "Interpolation in Digital Modems—Part ii: Implementation and performance", *IEEE Transactions on Communications*, vol. 41, No. 6, Jun. 1993.

*Primary Examiner*—Thang V. Tran
*Assistant Examiner*—Patrick Wamsley
*Attorney, Agent, or Firm*—Howard H. Sheerin; Dan A. Shifrin

[57] ABSTRACT

A sampled amplitude read channel reads user data and embedded servo data stored on a magnetic medium by detecting digital data from a sequence of discrete time interpolated sample values. A write frequency synthesizer generates a write clock for writing digital data to the magnetic medium at a predetermined baud rate for a selected zone, and upon read back, a read frequency synthesizer generates a fixed sampling clock at a frequency slightly higher than the write frequency at the outer zone. A sampling device samples the analog read signal at this fixed sampling rate across the data zones and servo wedges to generate a sequence of discrete time channel samples that are not synchronized to the baud rate. Before sampling, an analog receive filter processes the read signal to attenuate aliasing noise without having to adjust its spectrum across data zones or servo wedges. A discrete time equalizing filter equalizes the channel samples according to a predetermined partial response (PR4, EPR4, EEPR4, etc.). An interpolating timing recovery circuit, responsive to the equalized channel samples, computes an interpolation interval τ and, in response thereto, generates interpolated sample values substantially synchronized to the baud rate. The timing recovery circuit also generates a synchronous data clock for clocking a discrete time sequence detector and pulse detector which detect the digital user and servo data from the interpolated sample values.

8 Claims, 10 Drawing Sheets

U.S. PATENT DOCUMENTS

| | | | |
|---|---|---|---|
| 5,311,178 | 5/1994 | Pan et al. | 341/59 |
| 5,315,284 | 5/1994 | Bentley et al. | 340/146.2 |
| 5,321,559 | 6/1994 | Nguyen et al. | 360/46 |
| 5,343,340 | 8/1994 | Boutaghon et al. | 360/77.08 |
| 5,345,342 | 9/1994 | Abbott et al. | 360/48 |
| 5,359,631 | 10/1994 | Behrens et al. | 375/376 |
| 5,384,552 | 1/1995 | Iwasaki | 331/25 |
| 5,384,671 | 1/1995 | Fisher | 360/51 |
| 5,440,532 | 8/1995 | Yokogawa et al. | 369/32 |
| 5,481,568 | 1/1996 | Yada | 375/340 |

MAGNETIC DISK SAMPLED AMPLITUDE READ CHANNEL EMPLOYING INTERPOLATED TIMING RECOVERY FOR SYNCHRONOUS DETECTION OF EMBEDDED SERVO DATA

FIELD OF INVENTION

The present invention relates to the control of magnetic disk storage systems for digital computers, particularly to a sampled amplitude read channel that employs interpolated timing recovery for synchronous detection of embedded servo data.

CROSS REFERENCE TO RELATED APPLICATIONS AND PATENTS

This application is related to other co-pending U.S. patent applications, namely application Ser. No. 08/440,515 entitled "Sampled Amplitude Read Channel For Reading User Data and Embedded Servo Data From a Magnetic Medium," Ser. No. 08/341,251 entitled "Sampled Amplitude Read Channel Comprising Sample Estimation Equalization, Defect Scanning, Channel Quality, Digital Servo Demodulation, PID Filter for Timing Recovery, and DC Offset Control," Ser. No. 08/701,572 entitled "Improved Timing Recovery For Synchronous Partial Response Recording." This application is also related to several U.S. patents, namely U.S. Pat. No. 5,359,631 entitled "Timing Recovery Circuit for Synchronous Waveform Sampling," U.S. Pat. No. 5,291,499 entitled "Method and Apparatus for Reduced-Complexity Viterbi-Type Sequence Detectors," U.S. Pat. No. 5,297,184 entitled "Gain Control Circuit for Synchronous Waveform Sampling," U.S. Pat. No. 5,329,554 entitled "Digital Pulse Detector," and U.S. Pat. No. 5,424,881 entitled "Synchronous Read Channel." All of the above-named patent applications and patents are assigned to the same entity, and all are incorporated herein by reference.

BACKGROUND OF THE INVENTION

In magnetic storage systems for computers, digital data serves to modulate the current in a read/write head coil in order to write a sequence of corresponding magnetic flux transitions onto the surface of a magnetic medium in concentric, radially spaced tracks at a predetermined baud rate. When reading this recorded data, the read/write head again passes over the magnetic medium and transduces the magnetic transitions into pulses in an analog signal that alternate in polarity. These pulses are then decoded by read channel circuitry to reproduce the digital data.

Decoding the pulses into a digital sequence can be performed by a simple peak detector in a conventional analog read channel or, as in more recent designs, by a discrete time sequence detector in a sampled amplitude read channel. Discrete time sequence detectors are preferred over simple analog pulse detectors because they compensate for intersymbol interference (ISI) and are less susceptible to channel noise. As a result, discrete time sequence detectors increase the capacity and reliability of the storage system.

There are several well known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In conventional peak detection schemes, analog circuitry, responsive to threshold crossing or derivative information, detects peaks in the continuous time analog signal generated by the read head. The analog read signal is "segmented" into bit cell periods and interpreted during these segments of time. The presence of a peak during the bit cell period is detected as a "1" bit, whereas the absence of a peak is detected as a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits.

As the pulses are packed closer together on the concentric data tracks in the effort to increase data density, detection errors can also occur due to intersymbol interference, a distortion in the read signal caused by closely spaced overlapping pulses. This interference can cause a peak to shift out of its bit cell, or its magnitude to decrease, resulting in a detection error. The ISI effect is reduced by decreasing the data density or by employing an encoding scheme that ensures a minimum number of "0" bits occur between "1" bits. For example, a (d,k) run length limited (RLL) code constrains to d the minimum number of "0" bits between "1" bits, and to k the maximum number of consecutive "0" bits. A typical (1,7) RLL ⅔ rate code encodes 8 bit data words into 12 bit codewords to satisfy the (1,7) constraint.

Sampled amplitude detection, such as partial response (PR) with Viterbi detection, allows for increased data density by compensating for intersymbol interference and the effect of channel noise. Unlike conventional peak detection systems, sampled amplitude recording detects digital data by interpreting, at discrete time instances, the actual value of the pulse data. To this end, the read channel comprises a sampling device for sampling the analog read signal, and a timing recovery circuit for synchronizing the samples to the baud rate (code bit rate). Before sampling the pulses, a low pass analog filter processes the read signal to attenuate aliasing noise. After sampling, a digital equalizing filter equalizes the sample values according to a desired partial response, and a discrete time sequence detector, such as a Viterbi detector, interprets the equalized sample values in context to determine a most likely sequence for the digital data (i.e., maximum likelihood sequence detection MLSD). In this manner, a sampled amplitude read channel can take into account the effect of ISI and channel noise during the detection process, thereby decreasing the probability of a detection error. This increases the effective signal to noise ratio and, for a given (d,k) constraint, allows for significantly higher data density as compared to conventional analog peak detection read channels.

The application of sampled amplitude techniques to digital communication channels is well documented. See Y. Kabal and S. Pasupathy, "Partial Response Signaling", *IEEE Trans. Commun. Tech.*, Vol. COM-23, pp.921–934, September 1975; and Edward A. Lee and David G. Messerschmitt, "Digital Communication", Kluwer Academic Publishers, Boston, 1990; and G. D. Forney, Jr., "The Viterbi Algorithm", *Proc. IEEE*, Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications*, Vol. 10 No. 1, January 1992, pp.38–56; and Wood et al, "Viterbi Detection of Class IV Partial Response on a Magnetic Recording Channel", *IEEE Trans. Commun.*, Vol. Com-34, No. 5, pp.

454–461, May 1986; and Coker Et al, "Implementation of PRML in a Rigid Disk Drive", *IEEE Trans. on Magnetics*, Vol. 27, No. 6, November 1991; and Carley et al, "Adaptive Continous-Time Equalization Followed By FDTS/DF Sequence Detection", Digest of *The Magnetic Recording Conference*, Aug. 15–17, 1994, pp. C3; and Moon et al, "Constrained-Complexity Equalizer Design for Fixed Delay Tree Search with Decision Feedback", *IEEE Trans. on Magnetics*, Vol. 30, No. 5, September 1994; and Abbott et al, "Timing Recovery. For Adaptive Decision Feedback Equalization of The Magnetic Storage Channel", *Globecom'90 IEEE Global Telecommunications Conference* 1990, San Diego, Calif., November 1990, pp.1794–1799; and Abbott et al, "Performance of Digital Magnetic Recording with Equalization and Offtrack Interference", *IEEE Transactions on Magnetics*, Vol. 27, No. 1, January 1991; and Cioffi et al, "Adaptive Equalization in Magnetic-Disk Storage Channels", *IEEE Communication Magazine*, February 1990; and Roger Wood, "Enhanced Decision Feedback Equalization", *Intermag'90*.

Similar to conventional peak detection systems, sampled amplitude detection requires timing recovery in order to correctly extract the digital sequence. Rather than process the continuous signal to align peaks to the center of bit cell periods as in peak detection systems, sampled amplitude systems synchronize the pulse samples to the baud rate. In prior art sampled amplitude read channels, timing recovery synchronizes a sampling clock by minimizing an error between the signal sample values and estimated sample values. A pulse detector or slicer determines the estimated sample values from the read signal samples. Even in the presence of ISI the sample values can be estimated and, together with the signal sample values, used to synchronize the sampling of the analog pulses in a decision-directed feedback system.

A phase-locked-loop (PLL) normally implements the decision-directed feedback system to control timing recovery in sampled amplitude read channels. The PLL comprises a phase detector which generates a phase error based on the difference between the estimated samples and the read signal samples. A loop filter in the PLL filters the phase error, and the filtered phase error operates to synchronize the channel samples to the baud rate.

In prior art timing recovery methods, the phase error adjusts the frequency of a sampling clock which is typically the output of a variable frequency oscillator (VFO). The output of the VFO controls a sampling device, such as an analog-to-digital (A/D) converter, to synchronize the pulse samples to the baud rate.

Also in prior art timing recovery methods, it is helpful to first lock the PLL to a reference or nominal sampling frequency so that the desired sampling frequency, with respect to the analog pulses representing the digital data, can be acquired and tracked more efficiently. The nominal sampling frequency is the baud rate, the rate that data was written onto the medium. Therefore, one method to lock-to-reference is to generate a sinusoidal signal relative to the output of a write VFO (write clock) and inject this signal into the PLL. Once locked to the reference frequency, the PLL input switches from the write clock to the signal from the read head in order to synchronize the sampling of the waveform in response to a sinusoidal acquisition preamble recorded on the medium.

The acquisition and tracking modes for timing recovery are related to the data format of the magnetic disk. FIG. 2A shows a magnetic disk comprising a plurality of concentric data tracks 13 wherein each data track 13 comprises a plurality of sectors 15. Servo data in the form of wedges 17 are embedded into the sectors 15 and used to control and verify the track and sector position of the read/write head. FIG. 2B shows the format of a sector 15 comprising an acquisition preamble 68, a sync mark 70, and user data 72. The acquisition preamble is a predetermined sequence that allows timing recovery to acquire the desired sampling phase and frequency before reading the user data. After acquisition, the PLL switches to a tracking mode in order to track the desired sampling phase and frequency with respect to the analog pulses representing the user data. The sync mark signals the beginning of the user data. As illustrated in FIG. 2B, a short acquisition preamble is desirable to allow more storage area for user data.

Zoned recording is a technique known in the art for increasing the storage density by recording the user data at different rates in predefined zones between the inner diameter and outer diameter tracks. The data rate can be increased at the outer diameter tracks due to the increase in circumferential recording area and the decrease in intersymbol interference. This allows more data to be stored in the outer diameter tracks as is illustrated in FIG. 2A where the disk is partitioned into an outer zone 11 comprising fourteen data sectors per track, and an inner zone 27 comprising seven data sectors per track. In practice, the disk may actually be partitioned into several zones at varying data rates.

Prior techniques are known for acquiring and tracking the sampling frequency/phase based on the phase error computed from the actual signal samples and estimated signal samples obtained from symbol-by-symbol decisions. See "Timing Recovery in Digital Synchronous Receivers" by K. H. Mueller and M. Muller, IEEE Transactions on Communications, Vol. Com-24 (1976), pp. 516–531. Copending U.S. patent application Ser. No. 08/313,491 entitled "Improved Timing Recovery for Synchronous Partial Response Recording" discloses an improvement to the Mueller and Muller stochastic gradient method. In this method of timing recovery a slicer, commonly employed in a d=0 PR4 partial response recording channel, estimates the sample values by comparing the signal sample values to predetermined thresholds. A stochastic gradient circuit, which minimizes the mean squared error between the signal sample values and the estimated sample values, generates the phase error to control the frequency of the sampling VFO.

U.S. Pat. No. 5,359,631 entitled "Timing Recovery Circuit for Synchronous Waveform Sampling" discloses yet another method for timing recovery in a sampled amplitude read channel. In this method a pulse detector, commonly employed in a d=1 EPR4 or EEPR4 partial response recording channel, operates to determine the estimated sample values. Again, a stochastic gradient circuit uses the estimated sample values, together with the signal sample values, to generate the phase error for adjusting the sampling clock in the decision-directed feedback system.

The timing recovery loop filter controls the dynamics of the decision-directed feedback system. Accordingly, the loop filter coefficients are adjusted to achieve a desired transient response and tracking quality. For good tracking quality, the loop bandwidth should be narrow in order to attenuate phase noise and gain variance. During acquisition, the loop bandwidth should be as wide as possible without being unstable to achieve a fast transient response. A fast transient response results in a shorter acquisition time which minimizes the necessary length of the acquisition preamble.

In the above mentioned prior art methods for timing recovery, the phase error operates to adjust the sampling rate of the sampling VFO relative to the data rate of a particular zone on the disk. That is, when the read head passes into a new zone (e.g., outer zone 11 to inner zone 27 of FIG. 2A), the frequency of the sampling VFO is adjusted and eventually synchronized to the data rate of the new zone. This is normally accomplished by programming a center frequency setting of the sampling VFO to a value corresponding to the new zone, and then adjusting a fine frequency setting until the sampling VFO is synchronized to the data rate.

Several problems have been identified with the above prior art timing recovery methods that synchronize sampling of the pulses using a sampling VFO in a PLL.

For instance, the slight difference in operating frequencies between the write VFO and the sampling VFO can result in cross-talk that degrades the performance of timing recovery.

Further, synchronous detection of embedded servo data requires an additional servo VFO to generate the center operating frequency of the sampling VFO when reading the servo data (see the above referenced co-pending U.S. patent application Ser. No. 08/440,515, entitled "Sampled Amplitude Read Channel For Reading User Data and Embedded Servo Data From a Magnetic Medium").

Still further, adjusting the sampling rate relative to a particular zone requires a programmable analog filter to compensate for aliasing at the various data rates, a complex and expensive implementation that requires calibrating the analog filter to operate in each zone.

Yet another problem associated with conventional PLL timing recovery are the delays inherent in the sampling device and discrete time equalizing filter which cause the timing loop to be less stable. Thus, latency considerations can increase the cost and complexity of the sampling device and reduce the effectiveness of the equalizing filter. A more complex discrete time equalizing filter could equalize the samples before the timing loop, but this would require reconstruction at the filter's output from discrete-time back to continuous-time for processing by the sampling PLL.

There is, therefore, a need for a new timing recovery technique for sampled amplitude recording that does not exhibit the cross talk phenomena associated with a write VFO frequency being very near a sampling VFO frequency.

A further object is to avoid using a separate servo VFO for synchronous detection of embedded servo data.

Still another object is to obviate the expensive, programmable analog filter used for anti-aliasing in prior art zoned recording read channels.

Yet another object is to remove the sampling device and discrete time equalizing filter, and their associated latencies, from the timing recovery loop.

SUMMARY OF THE INVENTION

In a sampled amplitude read channel for magnetic disk recording, ansynchronously sampling the analog read signal at a fixed sample rate across the entire disk (i.e., a fixed sample rate over the various user data zones and the embedded servo wedges), extracting synchronous samples from the asynchronous samples using interpolated timing recovery rather than sampled timing recovery, and detecting the recorded digital data from the interpolated sample values. A write synthesizer generates a write clock for writing digital data to the magnetic disk at a predetermined baud rate for a selected zone, and upon read back, a read synthesizer generates a fixed sampling clock at a frequency slightly higher than the write frequency at the outer diameter zone (i.e, slightly higher than the highest baud rate). A sampling device samples the analog read signal at this fixed sample rate across the various data zones and servo wedges to generate a sequence of discrete time channel samples that are not synchronized to the baud rate. Before sampling, an analog receive filter having a fixed frequency response attenuates aliasing noise. After sampling, an equalizing filter equalizes the asynchronous channel samples according to a predetermined partial response (e.g., PR4, EPR4, EEPR4, DFE, etc.). An interpolating timing recovery circuit, responsive to the equalized channel samples, computes an interpolation interval τ and, in response thereto, generates interpolated sample values substantially synchronized to the baud rate. The interpolated timing recovery circuit also generates a data clock for clocking a discrete time sequence detector and a discrete time peak detector for detecting the user and servo data from the interpolated sample values.

Since the interpolating timing recovery does not use a separate sampling VFO, cross talk between the write VFO is avoided. Further, a separate servo VFO is not needed for synchronous detection of embedded servo data because the interpolating timing recovery can be adjusted on-the-fly to the servo data rate. In addition, the analog anti-aliasing filter can be fixed, rather than programmable, since the sampling rate is fixed over the entire disk. Still further, the sampling device and discrete time equalizing filter have been removed from the timing recovery loop, thereby avoiding the associated latencies.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Conventional Sampled Amplitude Read Channel

Figure 1A:
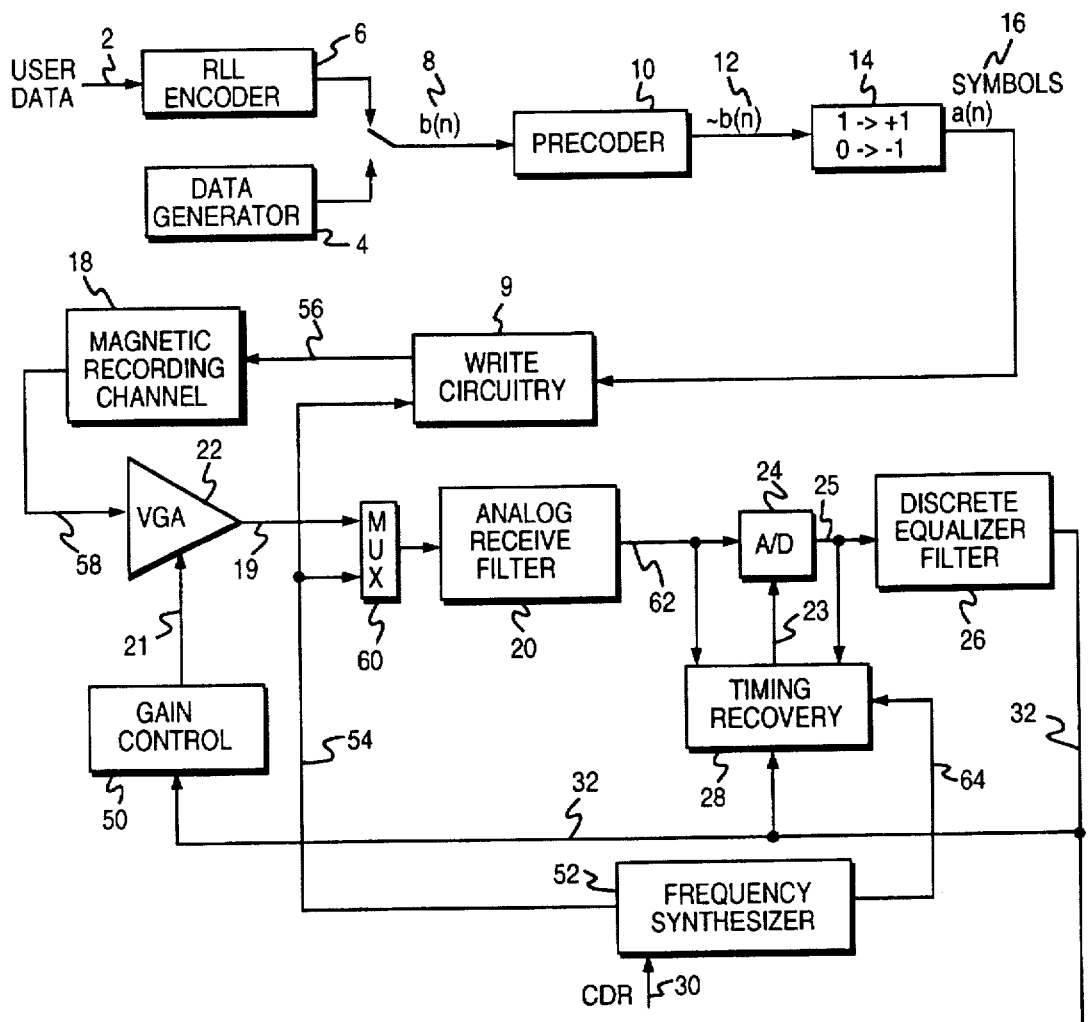
FIG. 1A is a block diagram of a conventional sampled amplitude recording channel.
Figure 1A:
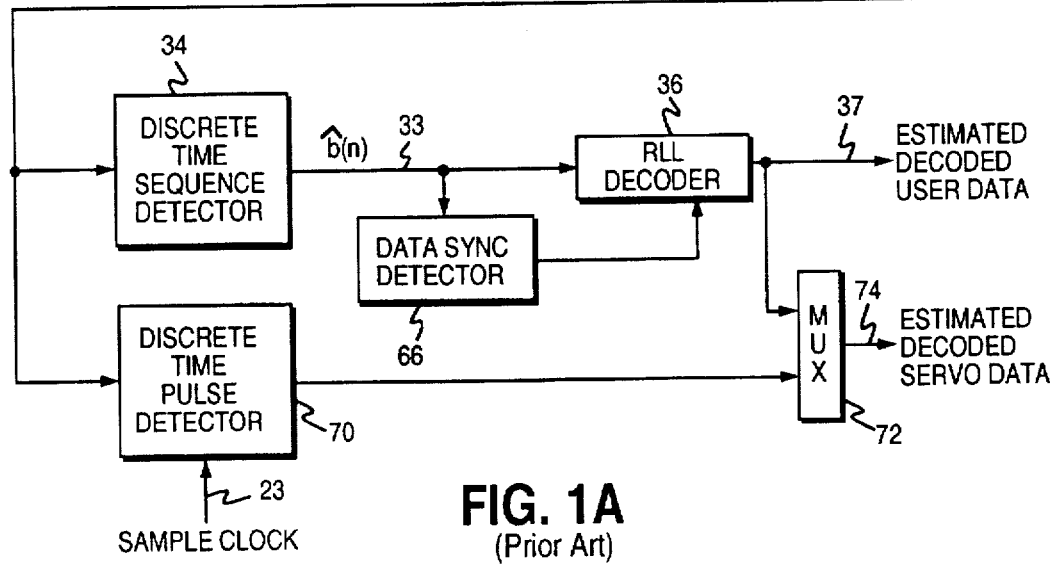

Referring now to FIG. 1A, shown is a detailed block diagram of a conventional sampled amplitude read channel. During a write operation, either user data 2 or preamble data from a data generator 4 (for example 2T preamble data) is written onto the media. An RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizing filters to form a precoded sequence ~b(n) 12. The precoded sequence ~b(n) 12 is converted into symbols a(n) 16 by translating 14 ~b(N)=0 into a(N)=−1, and ~b(N)=1 into a(N)=+1. Write circuitry 9, responsive to the symbols a(n) 16, modulates the current in the recording head coil at the baud rate 1/T to record the binary sequence onto the media. A frequency synthesizer 52 provides a baud rate write clock 54 to the write circuitry 9 and is adjusted by a channel data rate signal (CDR) 30 according to the zone the write head is over.

When reading the recorded binary sequence from the media, timing recovery 28 first locks to the write frequency by selecting, as the input to the read channel, the write clock 54 through a multiplexor 60. Once locked to the write frequency, the multiplexor 60 selects the signal 19 from the read head as the input to the read channel in order to acquire an acquisition preamble. A variable gain amplifier 22 adjusts the amplitude of the analog read signal 58, and an analog filter 20 provides initial equalization toward the desired response as well as attenuating aliasing noise. A sampling device 24 samples the analog read signal 62 from the analog filter 20, and a discrete time filter 26 provides further equalization of the sample values 25 toward the desired response. In partial response recording, for example, the desired response is often selected from Table 1.

The equalized sample values 32 are applied to decision directed gain control 50 and timing recovery 28 for adjusting the amplitude of the read signal 58 and the frequency and phase of the sampling device 24, respectively. Timing recovery adjusts the frequency of sampling device 24 over line 23 in order to synchronize the equalized samples 32 to the baud rate. Frequency synthesizer 52 provides a course center frequency setting to the timing recovery circuit 28 over line 64 in order to center the timing recovery frequency over temperature, voltage, and process variations. The channel data rate (CDR) 30 signal adjusts a frequency range of the synthesizer 52 according to the data rate for the current zone. Gain control 50 adjusts the gain of variable gain amplifier 22 over line 21. The equalized samples Y(n) 32 are sent to a discrete time sequence detector 34, such as a maximum likelihood (ML) Viterbi sequence detector, and to a discrete time peak detector 70 which detect an estimated binary sequence of user/servo data. An RLL decoder 36 decodes the estimated binary sequence ^b(n) 33 from the sequence detector 34 into estimated user/servo data 37. A data sync detector 66 detects the sync mark 70 (shown in FIG. 2B) in the data sector 15 in order to frame the operation of the RLL decoder 36. A multiplexor 72 selects the output 37 of the RLL decoder 36 or peak detector 70 as the estimated decoded servo data 74 output to a servo controller (not shown) for positioning the read/write head. In the absence of errors, the estimated binary sequence ^b(n) 33 equals the recorded binary sequence b(n) 8, and the decoded user data 37 equals the recorded user data 2.

Data Format

Figure 2A:
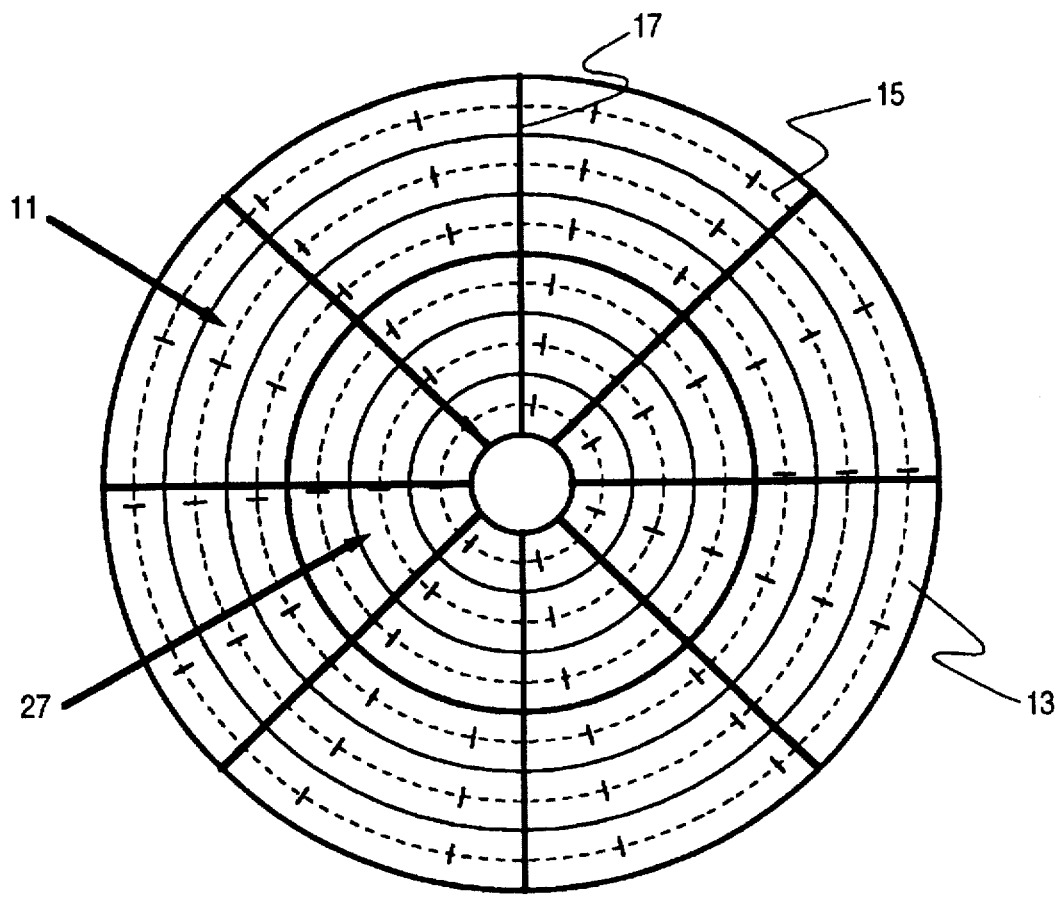
FIG. 2A shows an exemplary data format of a magnetic disk having a plurality of concentric tracks comprised of a plurality of user data sectors and embedded servo data sectors.

FIG. 2A shows an exemplary data format of a magnetic media comprising a series of concentric data tracks 13 wherein each data track 13 comprises a plurality of sectors 15 with embedded servo wedges 17. A servo controller (not shown) processes the servo data in the servo wedges 17 and, in response thereto, positions the read/write head over a desired track. Additionally, the servo controller processes servo bursts within the servo wedges 17 to keep the head aligned over a centerline of the desired track while writing and reading data. The servo wedges 17 may be detected by a simple discrete time pulse detector 70 or by the discrete time sequence detector 34. If the sequence detector 34 detects the servo data, then the format of the servo wedges 17 includes a preamble and a sync mark, similar to the user data sectors 15.

Figure 2B:
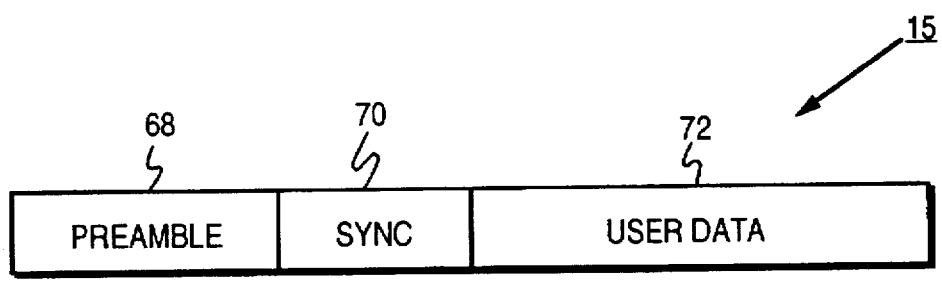
FIG. 2B shows an exemplary format of a user data sector.

FIG. 2B shows the format of a user data sector 15 comprising an acquisition preamble 68, a sync mark 70, and user data 72. Timing recovery uses the acquisition preamble 68 to acquire the correct sampling frequency and phase before reading the user data 72, and the sync mark 70 demarks the beginning of the user data 72 (see co-pending U.S. patent application Ser. No. 08/701,572 entitled "Improved Timing Recovery For Synchronous Partial Response Recording").

To increase the overall storage density, the disk is partitioned into an outer zone 11 comprising fourteen data sectors per track, and an inner zone 27 comprising seven data sectors per track. In practice, the disk is actually partitioned into several zones and the data recorded and detected at varying data rates.

Channel Frequency Spectrum

Figure 1B:
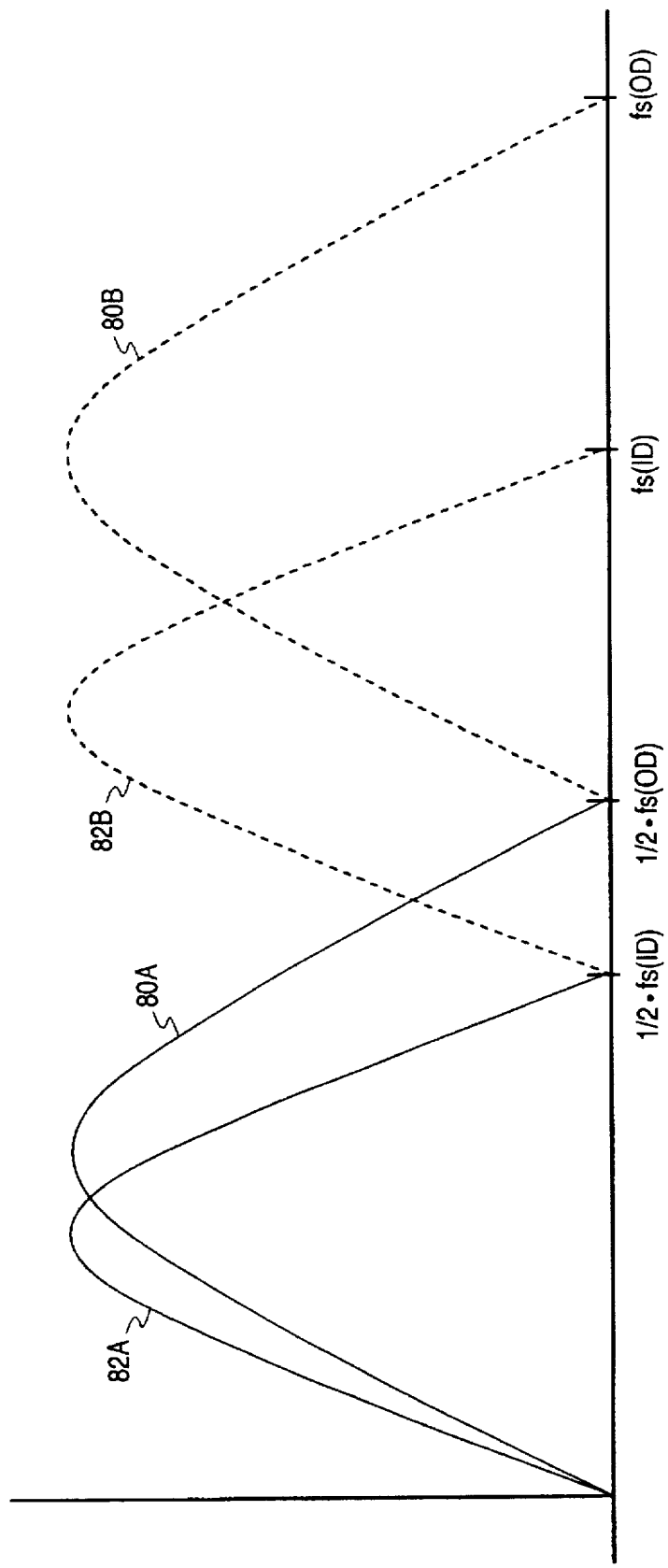
FIG. 1B shows a frequency spectrum of the sampled channel data according to the prior art method of adjusting the sampling rate relative to the data rate of the zone where the read head is positioned.

FIG. 1B shows a frequency spectrum of the sampled channel data according to the prior art method of adjusting the sampling rate relative to the data rate of the zone where the read head is positioned. With timing recovery 28 synchronizing the sampling 24 of the read signal 62 to the channel data rate using the prior art method, then according to the Nyquist sampling theorem, the bandwidth of the analog read signal 19 must be constrained to half the sampling rate in order to attenuate aliasing noise. This means that the analog receive filter 20 must cutoff the frequency components of the analog read signal 19 above ½ the sampling frequency (i.e., the data rate). Since the sampling frequency is adjusted to the data rate corresponding to the various zones, the analog receive filter must also be programmed to adjust its cutoff frequency accordingly. This is illustrated in FIG. 1B which shows the frequency spectrum of the channel when sampling at an outer diameter (OD) zone $f_s(OD)$ and at an inner diameter (ID) zone $f_s(ID)$. When sampling at $f_s(OD)$, the analog receive filter 20 must be programmed to pass frequencies 80A below $½ \cdot f_s(OD)$, and cutoff frequencies 80B higher than $½ \cdot f_s(OD)$. Similarly, when sampling at $f_s(ID)$, the analog receive filter 20 must be programmed to pass frequencies 82A below $½ \cdot f_s(ID)$, and cutoff frequencies 82B higher than $½ \cdot f_s(ID)$. Programmable analog filters are expensive, complex in implementation, and must be calibrated to operate in each zone. In addition, as can be seen in FIG. 1B, the analog filter must have a relatively sharp rolloff so that it does not attenuate the signal spectrum below $½ \cdot f_s$, which further increases its cost and complexity.

Figure 1C:
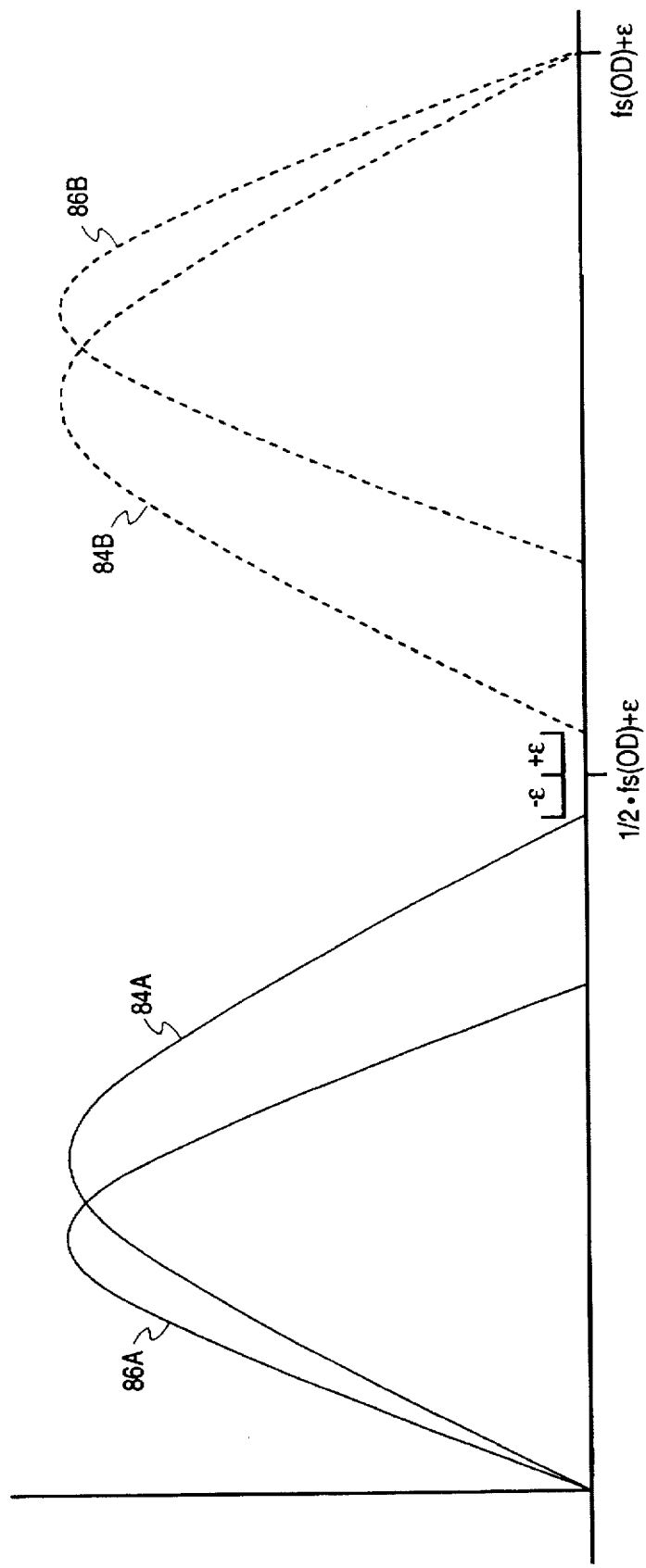
FIG. 1C shows, according to the present invention, a frequency spectrum of the sampled channel data when the sampling rate is fixed at a frequency slightly higher than the data rate at the outer diameter zone and not adjusted when reading data from the inner diameter zones, or when reading the servo data.

The present invention reduces the complexity and cost of the analog filter by sampling 24 the analog read signal 19 at a fixed frequency across the entire disk. In this manner, the analog receive filter's cutoff frequency can remain fixed, and it does not require as sharp a rolloff. This is illustrated in FIG. 1C where the analog read signal 19 is sampled 24 at a frequency slightly higher than the data rate of the outer diameter track (i.e., sampled at $f_s(OD)+\epsilon$). When reading data from any zone on the disk, the analog receive filter 20 must pass frequencies below $½·f_s(OD)$ and cutoff frequencies above $(½·f_s(OD))+2\epsilon$. In other words, the analog receive filter's cutoff frequency can remain fixed because the desired signal spectrum changes shape from the outer diameter (i.e., spectrum 84A) to the inner diameter (i.e., spectrum 86A), but the position of the aliased spectrums (i.e., spectrums 84B and 86B, respectively) remain fixed. Furthermore, the analog receive filter's rolloff can be flatter due to oversampling rather than synchronous sampling the read signal; that is, the analog filter's rolloff constraint lessens the more the read signal is oversampled (by increasing $\epsilon$).

Sampling the analog read signal at a fixed, oversampled rate requires two enabling modifications to the prior art sampled amplitude read channels: first, it requires interpolated (rather than synchronous sampling) timing recovery to extract synchronous data from the asynchronous samples; and second, it requires a more complex discrete time equalizing filter.

The spectrum of the discrete time equalizing filter in prior art synchronous sampling read channels scales with the changing sampling rates across the zones. Only minor adjustments are necessary to compensate for any deviations in the disk's frequency response from zone to zone. In the present invention, however, the sampling rate is fixed across the zones; the spectrum of the discrete filter does not scale to the data rate—it must be adjusted accordingly. Accurate adjustment of the discrete filter's spectrum to generate the desired partial response across the various zones when using a fixed sampling rate requires a higher number of taps and coefficients. The discrete filter is normally implemented as a transversal FIR filter, and those skilled in the art can readily construct this filter with a sufficient number of taps and coefficients necessary to implement the fixed sampling technique of the present invention. The details of the discrete filter are, therefore, not included in this disclosure.

While the discrete time equalizing filter of the present invention requires more taps and coefficients in order to accurately shape the read signal's frequency response across the zones, the cost of discrete time circuitry, such as digital circuitry implemented in CMOS, is rapidly decreasing as the size and cost per gate decrease. In addition, digital circuitry is more robust and provides higher yields (i.e., less defective parts). The present invention provides yet another advantage in fixing the analog receive filter across the zones and loosening the rolloff constraint: it significantly reduces the cost and complexity of the analog filter. In fact, a simple, passive RC network will suffice.

The other design modification necessary to implement the present invention, interpolated timing recovery, will now be discussed in greater detail.

Improved Sampled Amplitude Read Channel

Figure 3:
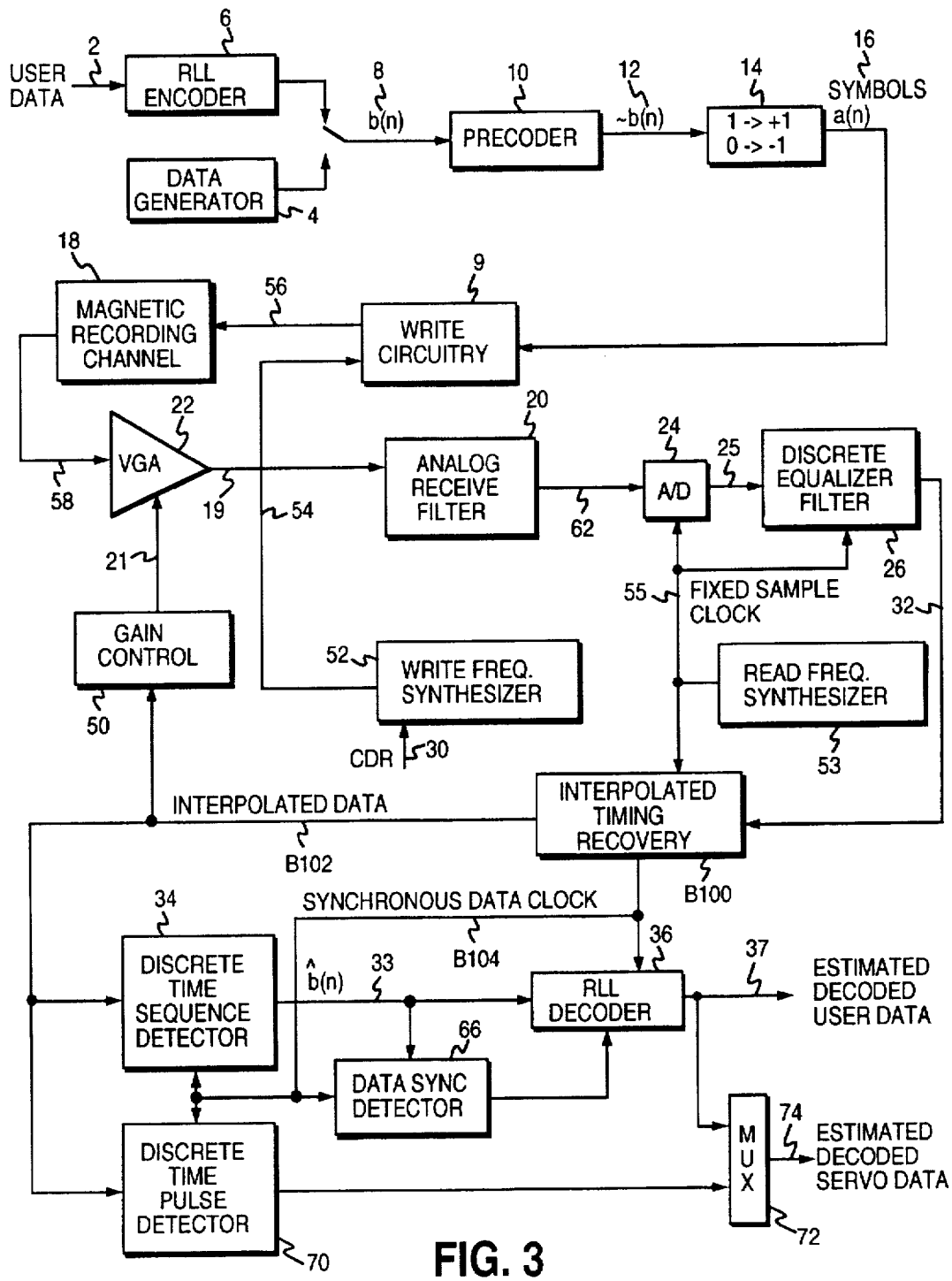
FIG. 3 is a block diagram of the improved sampled amplitude read channel of the present invention comprising interpolated timing recovery for generating interpolated sample values and a synchronous data clock for clocking operation of a discrete time sequence detector and peak detector.

FIG. 3 shows the improved sampled amplitude read channel of the present invention wherein the conventional sampled timing recovery 28 of FIG. 1A has been replaced by interpolated timing recovery B100. In addition to a write frequency synthesizer 52 for generating a baud rate write clock 54 applied to the write circuitry 9 at a frequency relative to the current zone (CDR 30), a read frequency synthesizer 53 generates a fixed sampling clock 55 applied to the sampling device 24, the discrete time equalizer filter 26, and the interpolated timing recovery B100.

When reading data from any particular zone, the read frequency synthesizer 53 outputs a fixed sampling clock 55 at a frequency slightly higher than the highest data rate (which normally occurs at the outer diameter zone). The analog receive filter 20 used for anti-aliasing has a fixed spectrum since the sampling frequency does not change across the zones. This reduces the complexity and cost of the analog filter 20 and simplifies the operation of the read channel by not having to calibrate the analog filter 20 to operate optimumly in each zone. The interpolated timing recovery B100 interpolates the equalized sample values 32 to generate interpolated sample values B102 substantially synchronized to the data rate of the current zone or to the data rate of the servo wedge 17.

A discrete time sequence detector 34 detects an estimated binary sequence 33 representing the user/servo data from the interpolated sample values B102. Alternatively, a discrete time pulse detector 70 detects the servo data from the interpolated sample values B102. Interpolated timing recovery B100 generates a synchronous data clock B104 for clocking operation of the discrete time sequence detector 34, discrete time pulse detector 70, sync mark detector 66 and RLL decoder 36.

Conventional Timing Recovery

Figure 4A:
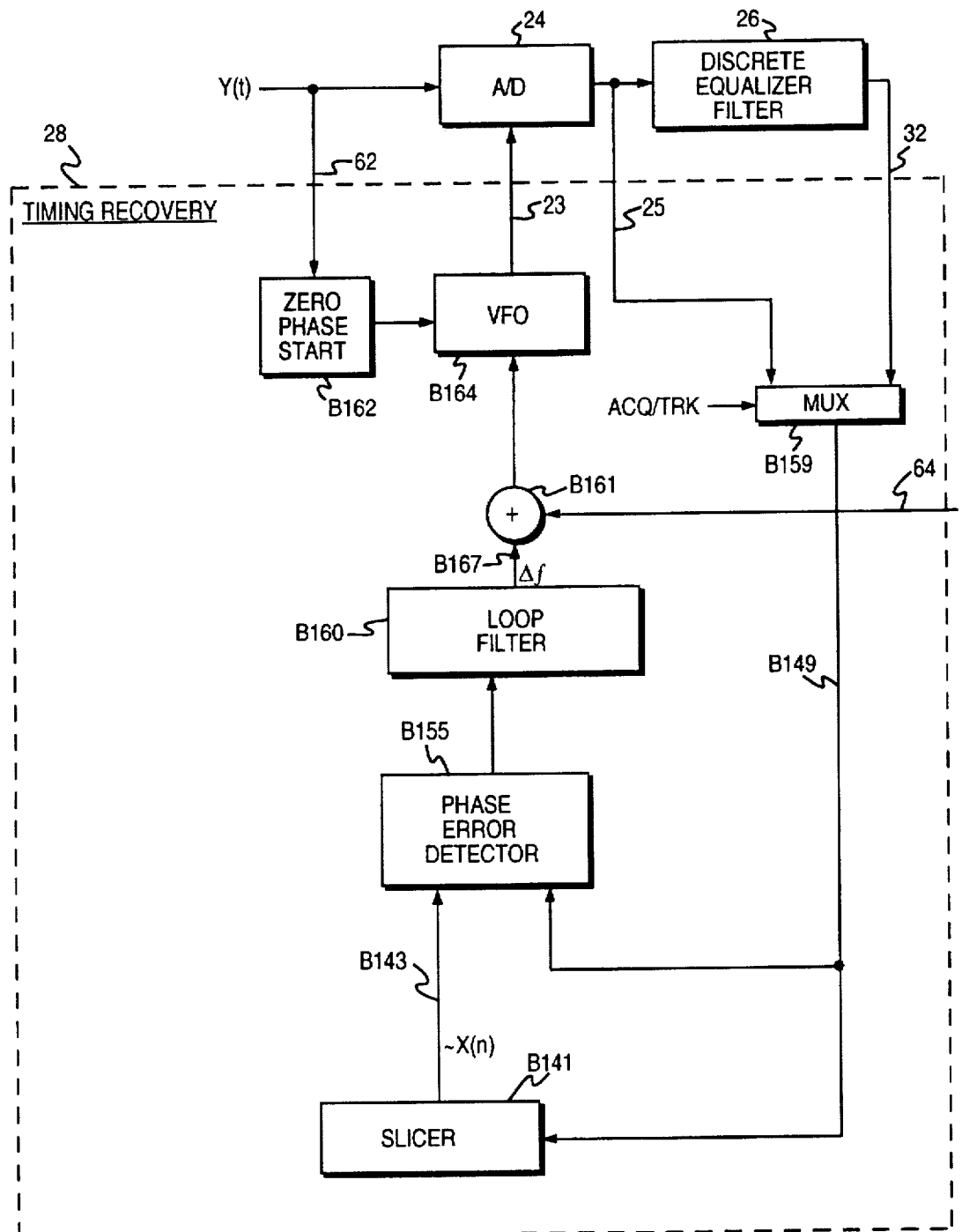
FIG. 4A is a detailed block diagram of the prior art sampling timing recovery comprising a sampling VFO.

An overview of the conventional sampling timing recovery 28 of FIG. 1a is shown in FIG. 4A. The output 23 of a variable frequency oscillator (VFO) B164 controls the sampling clock of a sampling device 24 which is typically an analog-to-digital converter (A/D) in digital read channels. A multiplexer B159 selects the unequalized sample values 25 during acquisition and the equalized sample values 32 during tracking, thereby removing the discrete equalizer filter 26 from the timing loop during acquisition in order to avoid its associated latency. A phase error detector B155 generates a phase error in response to the sample values received over line B149 and estimated sample values ~X(n) from a sample value estimator B141, such as a slicer in a d=0 PR4 read channel, over line B143. A loop filter B160 filters the phase error to generate a frequency offset $\Delta f$ B167 that settles to a value proportional to a frequency difference between the sampling clock 23 and the baud rate. The frequency offset $\Delta f$ B167, together with the center frequency control signal 64 from the frequency synthesizer 52, adjust the sampling clock 23 at the output of the VFO B164 in order to synchronize the sampling to the baud rate. A zero phase start B162 circuit suspends operation of the VFO 164 at the beginning of acquisition in order to minimize the initial phase error between the sampling clock 23 and the read signal 62. This is achieved by disabling the VFO B164, detecting a zero crossing in the analog read signal 62, and re-enabling the VFO 164 after a predetermined delay between the detected zero crossing and the first baud rate sample.

Interpolated Timing Recovery

Figure 4B:
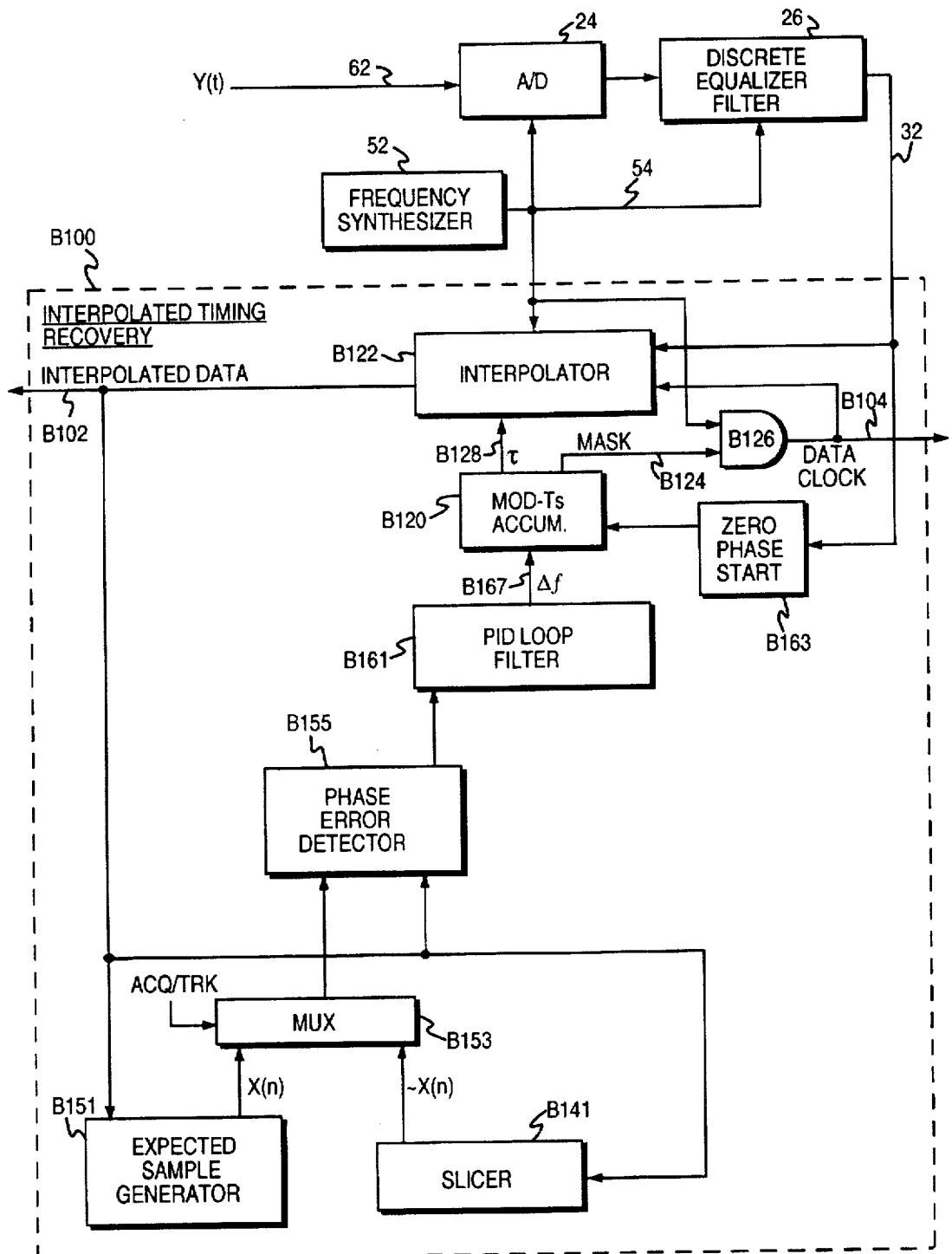
FIG. 4B is a detailed block diagram of the interpolating timing recovery of the present invention comprising an interpolator.

The interpolated timing recovery B100 of the present invention is shown in FIG. 4B. The VFO B164 of FIG. 4A is replaced with a modulo-Ts accumulator B120 and an interpolator B122. In addition, an expected sample value generator B151, responsive to interpolated sample values B102, generates expected samples X(n) used by the phase error detector 155 to compute the phase error during acquisition. A multiplexer B153 selects the estimated sample values ~X(n) from the slicer for use by the phase error detector 155 during tracking. The data clock B104 is generated at the output of an AND gate B126 in response to the sampling clock 54 and a mask signal B124 from the modulo-Ts accumulator B120 as discussed in further detail below. The phase error detector B155 and the slicer B141 process interpolated sample values B102 at the output of the interpolator B122 rather than the channel sample values 32 at the output of the discrete equalizer filter 26 as in FIG. 4A. A PID loop filter B161 controls the closed loop frequency response similar to the loop filter B160 of FIG. 4A.

In the interpolated timing recovery of the present invention, locking a VFO to a reference frequency before acquiring the preamble is no longer necessary; multiplexing 60 the write clock 54 into the analog receive filter 20 is not necessary. Further, the sampling device 24 and the discrete equalizer filter 26 together with their associated delays have been removed from the timing loop; it is notnecessary to multiplex B159 around the equalizer filter 26 between acquisition and tracking. However, it is still necessary to acquire a preamble 68 before tracking the user data 72. A zero phase start circuit B163 minimizes the initial phase error between the interpolated sample values and the baud rate at the beginning of acquisition similar to the zero phase start circuit B162 of FIG. 4A. However, rather than suspend operation of a sampling VFO B164, the zero phase start circuit B163 for interpolated timing recovery computes an initial phase error τ from the equalized sample values 32 and loads the initial phase error into the modulo-Ts accumulator B120.

For a more detailed description of the PID loop filter B160, phase error detector 155, frequency error detector 157, expected sample generator B151, and slicer B141, refer to the above referenced co-pending U.S. patent applications "Sampled Amplitude Read Channel Comprising Sample Estimation Equalization, Defect Scanning, Channel Quality, Digital Servo Demodulation, PID Filter for Timing Recovery, and DC Offset Control" and "improved Timing Recovery For Synchronous Partial Response Recording." A detailed description of the modulo-Ts accumulator B102, data clock B126, and interpolator B122 is provided in the following discussion.

Interpolator

Figure 5:
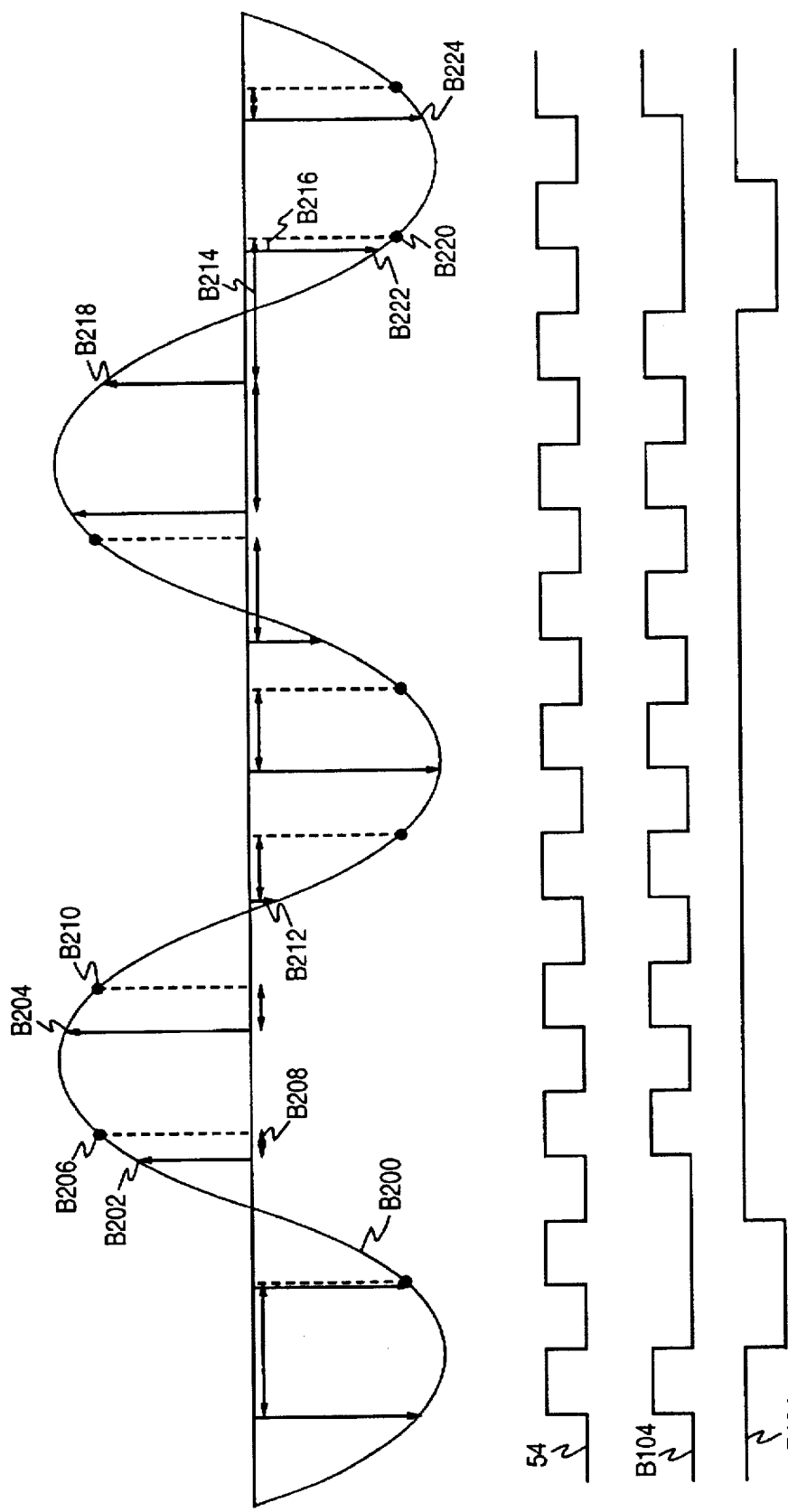
FIG. 5 illustrates the channels samples in relation to the interpolated baud rate samples for the acquisition preamble.

The interpolator B122 of FIG. 4B is understood with reference to FIG. 5 which shows a sampled 2T-acquisition preamble signal B200. The target synchronous sample values are shown as black circles and the asynchronous channel sample values as arrows. Bellow the sampled preamble signal is a timing diagram depicting the corresponding timing signals for the sampling clock 54, the data clock B104 and the mask signal B124. As can be seen in FIG. 5, the preamble signal B200 is sampled slightly faster than the baud rate (the rate of the target values).

The function of the interpolator is to estimate the target sample value by interpolating the channel sample values. For illustrative purposes, consider a simple estimation algorithm, linear interpolation:

$$Y(N)=x(N)+\tau \cdot (x(N-1)-x(N)); \text{ where:} \quad (1)$$

x(N) and x(N−1) are the channel samples surrounding the target sample; and τ is an interpolation interval proportional to a time difference between the channel sample value x(N−1) and the target sample value. The interpolation interval τ is generated at the output of modulo-Ts accumulator B120 which accumulates the frequency offset signal Δf B167 at the output of the PID loop filter B160:

$$\tau=(\Sigma \Delta f) \text{ MOD } Ts; \text{ where:} \quad (2)$$

Ts is the sampling period of the sampling clock 54. Since the sampling clock 54 samples the analog read signal 62 slightly faster than the baud rate, it is necessary to mask the data clock every time the accumulated frequency offset Δf, integer divided by Ts, increments by 1. Operation of the data clock B104 and the mask signal B124 generated by the modulo-Ts accumulator B120 is understood with reference to the timing diagram of FIG. 5.

Assuming the interpolator implements the simple linear equation (1) above, then channel sample values B202 and B204 are used to generate the interpolated sample value corresponding to target sample value B206. The interpolation interval τ B208 is generated according to equation (2) above. The next interpolated sample value corresponding to the next target value B210 is computed from channel sample values B204 and B212. This process continues until the interpolation interval τ B214 would be greater than Ts except that it "wraps" around and is actually τ B216 (i.e., the accumulated frequency offset Δf, integer divided by Ts, increments by 1 causing the mask signal B124 to activate). At this point, the data clock B104 is masked by mask signal B124 so that the interpolated sample value corresponding to the target sample value B220 is computed from channel sample values B222 and B224 rather than channel sample values B218 and B222.

The simple linear interpolation of equation (1) will only work if the analog read signal is sampled at a much higher frequency than the baud rate. This is not desirable since operating the channel at higher frequencies increases its complexity and cost. Therefore, in the preferred embodiment the interpolator B122 is implemented as a filter responsive to more than two channel samples to compute the interpolated sample value.

The ideal discrete time phase interpolation filter has a flat magnitude response and a constant group delay of τ:

$$C_\tau(e^{j\omega})=e^{j\omega \tau} \quad (3)$$

which has an ideal impulse response:

$$\text{sinc}(\pi \cdot (n-\tau/T_s)). \quad (4)$$

Unfortunately, the above non-causal infinite impulse response (4) cannot be realized. Therefore, the impulse response of the interpolation filter is designed to be a best fit approximation of the ideal impulse response (4). This can be accomplished by minimizing a mean squared error between the frequency response of the actual interpolation filter and the frequency response of the ideal interpolation filter (3). This approximation can be improved by taking into account the spectrum of the input signal, that is, by minimizing the mean squared error between the input spectrum multiplied by the actual interpolation spectrum and the input spectrum multiplied by the ideal interpolation spectrum:

$$\overline{C}_\tau(e^{j\omega})X(e^{j\omega})-C_\tau(e^{j\omega})X(e^{j\omega}); \text{ where:} \quad (5)$$

$\overline{C}_\tau(e^{j\omega})$ is the spectrum of the actual interpolation filter; and $X(e^{j\omega})$ is the spectrum of the input signal. From equation (5), the mean squared error is represented by:

$$E_\tau^2 = \frac{1}{2\pi} \int_{-\pi}^{\pi} |\bar{C}_\tau(e^{j\omega}) - e^{j\omega\tau}|^2 |X(e^{j\omega})|^2 d\omega; \text{ where:} \quad (6)$$

$X(e^{j\omega})$ is the spectrum of the read channel (e.g., PR4, EPR4, EEPR4 of Table 1 or some other partial response spectrum).

In practice, the above mean squared error equation (6) is modified by specifying that the spectrum of the input signal is bandlimited to some predetermined constant $0 \leq \omega \leq \alpha\pi$ where $0 < \alpha < 1$; that is:

$|X(e^{j\omega})|=0$, for $|\omega| \geq \alpha\pi$.

Then equation (6) can be expressed as:

$$E_{\tau,\alpha}^2 = \frac{1}{2\pi} \int_{-\alpha\pi}^{\alpha\pi} |\bar{C}_\tau(e^{j\omega}) - e^{j\omega\tau}|^2 |X(e^{j\omega})|^2 d\omega. \quad (7)$$

The solution to the minimization problem of equation (7) involves expressing the actual interpolation filter in terms of its coefficients and then solving for the coefficients that minimize the error in a classical mean-square sense.

The actual interpolation filter can be expressed as the FIR polynomial:

$$\bar{C}_\tau(e^{j\omega}) = \sum_{n=-R}^{n=R-1} C_\tau(n) e^{-j\omega n}; \text{ where:} \quad (8)$$

2R is the number of taps in each interpolation filter and the sample period Ts has been normalized to 1. A mathematical derivation for an interpolation filter having an even number of coefficients is provided bellow. It is within the ability of those skilled in the art to modify the mathematics to derive an interpolation filter having an odd number of coefficients.

Substituting equation (8) into equation (7) leads to the desired expression in terms of the coefficients $C_\tau(n)$:

$$E_{\tau,\alpha}^2 = \frac{1}{2\pi} \int_{-\alpha\pi}^{\alpha\pi} \left| \sum_{n=-R}^{n=R-1} C_\tau(n) e^{-j\omega n} - e^{j\omega\tau} \right|^2 |X(e^{j\omega})|^2 d\omega. \quad (9)$$

The next step is to take the derivatives of equation (9) with respect to the coefficients $C_\tau(n)$ and set them to zero:

$$\frac{\partial E_{\tau,\alpha}^2}{\partial C_\tau(n_o)} = 0 \text{ for } n_o = -R, \ldots, 0, 1, \ldots, R-1. \quad (10)$$

After careful manipulation, equation (10) leads to:

$$\int_{-\alpha\pi}^{\alpha\pi} \left[ \left( \sum_{n=-R}^{n=R-1} C_\tau(n) \cos(\omega(n_o - n)) \right) - \cos(\omega(n_o + \tau)) \right] |X(e^{j\omega})|^2 d\omega = 0 \quad (11)$$

Defining $\phi(r)$ as $$\phi(r) = \int_{-\alpha\pi}^{\alpha\pi} |X(e^{j\omega})|^2 \cos(\omega r) d\omega \quad (12)$$

and substituting equation (12) into equation (11) gives:

$$\sum_{n=-R}^{n=R-1} C_\tau(n) \phi(n - n_o) = \phi(n_o + \tau) \quad (13)$$

for $n_o = -R, \ldots, 0, 1, \ldots, R-1$.

Equation (13) defines a set of 2R linear equations in terms of the coefficients $C_\tau(n)$. Equation (13) can be expressed more compactly in matrix form:

$\Phi_T C_\tau = \Phi_\tau$; where:

$C_\tau$ is a column vector of the form:

$C_\tau = [c_\tau(c_\tau(-R), \ldots, c_\tau(0), \ldots, c_\tau(R-1)]^t$ $\Phi_T$ is a Toeplitz matrix of the form:

$$\Phi_T = \begin{bmatrix} \phi(0) & \phi(1) & \cdots & \phi(2R-1) \\ \phi(1) & \phi(0) & & \\ \cdot & & & \\ \cdot & & & \\ \cdot & & & \\ \phi(2R-1) & & \cdots & \phi(0) \end{bmatrix}$$

and $\Phi_\tau$ is a column vector of the form:

$\Phi_\tau = [\phi(-R+\tau), \ldots, \phi(\tau), \phi(1+\tau), \ldots, \phi(R-1+\tau)]^t$. (14)

The solution to equation (14) is:

$C_\tau = \Phi_T^{-1} \Phi_\tau$; where: (15)

$\Phi_T^{-1}$ is an inverse matrix that can be solved using well known methods.

Figure 6:
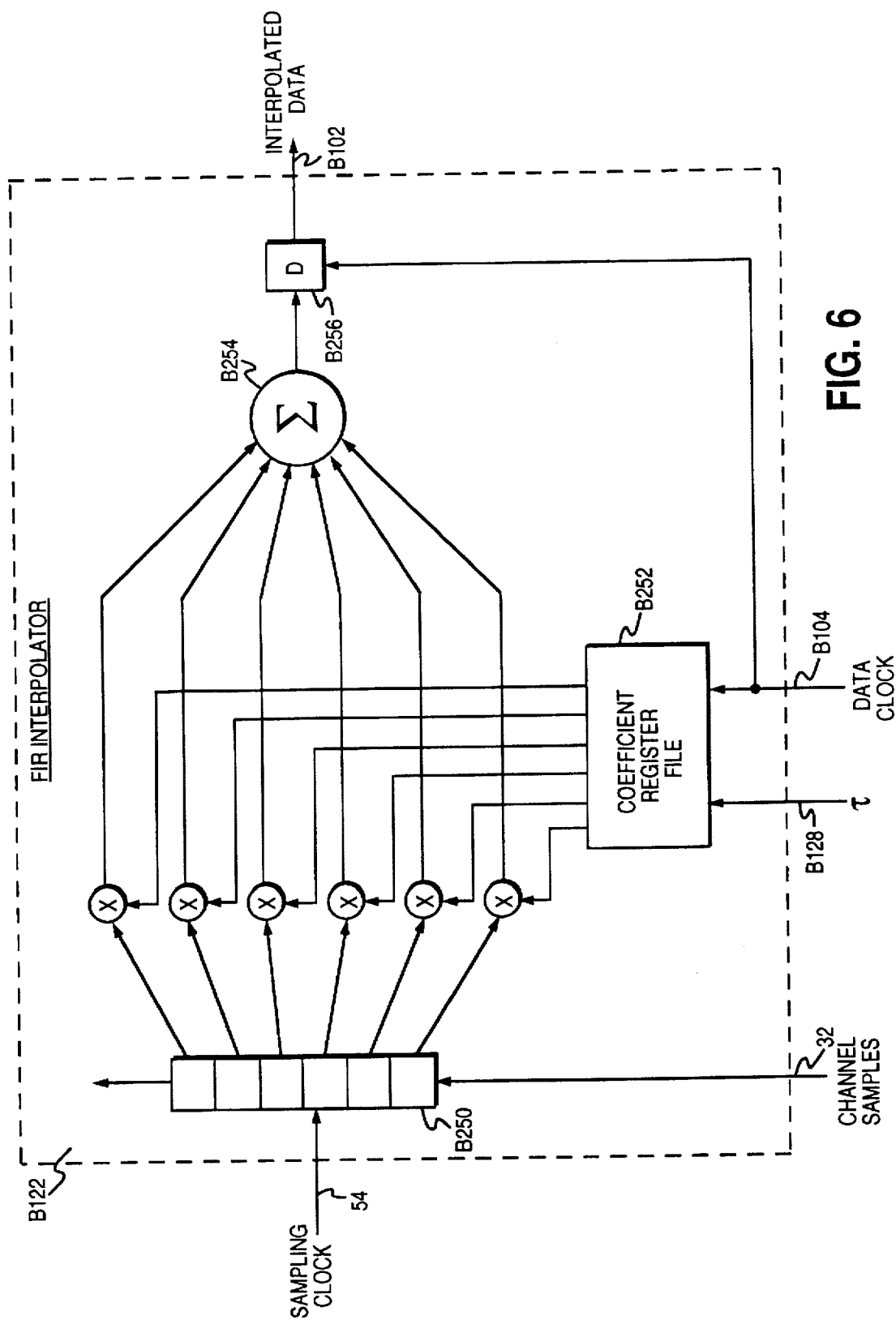
FIG. 6 shows an FIR filter implementation for the timing recovery interpolator.

Table B2 shows example coefficients $C_\tau(n)$ calculated from equation (15) with 2R=6, $\alpha$=0.8 and $X(e^{j\omega})$=PR4. The implementation of the six tap FIR filter is shown in FIG. 6. A shift register B250 receives the channel samples 32 at the sampling clock rate 54. The filter coefficients $C_\tau(n)$ are stored in a coefficient register file B252 and applied to corresponding multipliers according to the current value of $\tau$ B128. The coefficients are multiplied by the channel samples 32 stored in the shift register B250. The resulting products are summed B254 and the sum stored in a delay register B256. The coefficient register file B252 and the delay register B256 are clocked by the data clock B104 to implement the masking function described above.

In an alternative embodiment not shown, a plurality of static FIR filters, having coefficients that correspond to the different values of $\tau$, filter the sample values in the shift register B250. Each filter outputs an interpolation value, and the current value of the interpolation interval $\tau$ B128 selects the output of the corresponding filter as the output B102 of the interpolator B122. Since the coefficients of one filter are not constantly updated as in FIG. 6, this multiple filter embodiment increases the speed of the interpolator B122 and the overall throughput of the read channel.

Cost Reduced Interpolator

Rather than store all of the coefficients of the interpolation filters in memory, in a more efficient, cost reduced implementation the coefficient register file B252 of FIG. 6 computes the filter coefficients $C_\tau(n)$ in real time as a function of $\tau$. For example, the filter coefficients $C_\tau(n)$ can be computed in real time according to a predetermined polynomial in $\tau$ (see, for example, U.S. Pat. No. 4,866,647 issued to Farrow entitled, "A Continuously Variable Digital Delay Circuit," the disclosure of which is hereby incorporated by reference). An alternative, preferred embodiment for computing the filter coefficients in real time estimates the filter coefficients according to a reduced rank matrix representation of the coefficients.

15

The bank of filter coefficients stored in the coefficient register file B252 can be represented as an M×N matrix $A_{M \times N}$, where N is the depth of the interpolation filter (i.e., the number of coefficients $C_\tau(n)$ in the impulse response computed according to equation (15)) and M is the number of interpolation intervals (i.e., the number of $\tau$ intervals). Rather than store the entire $A_{M \times N}$ matrix in memory, a more efficient, cost reduced implementation is attained through factorization and singular value decomposition (SVD) of the $A_{M \times N}$ matrix.

Consider that the $A_{M \times N}$ matrix can be factored into an $F_{M \times N}$ and $G_{N \times N}$ matrix, $$A_{M \times N} = F_{M \times N} \cdot G_{N \times N}.$$

Then a reduced rank approximation of the $A_{M \times N}$ matrix can be formed by reducing the size of the $F_{M \times N}$ and $G_{N \times N}$ matrices by replacing N with L where L<N and, preferably, L<<N. Stated differently, find the $F_{M \times L}$ and $G_{L \times N}$ matrices whose product best approximates the $A_{M \times N}$ matrix, $$A_{M \times N} = F_{M \times L} \cdot G_{L \times N}.$$

Figure 7:
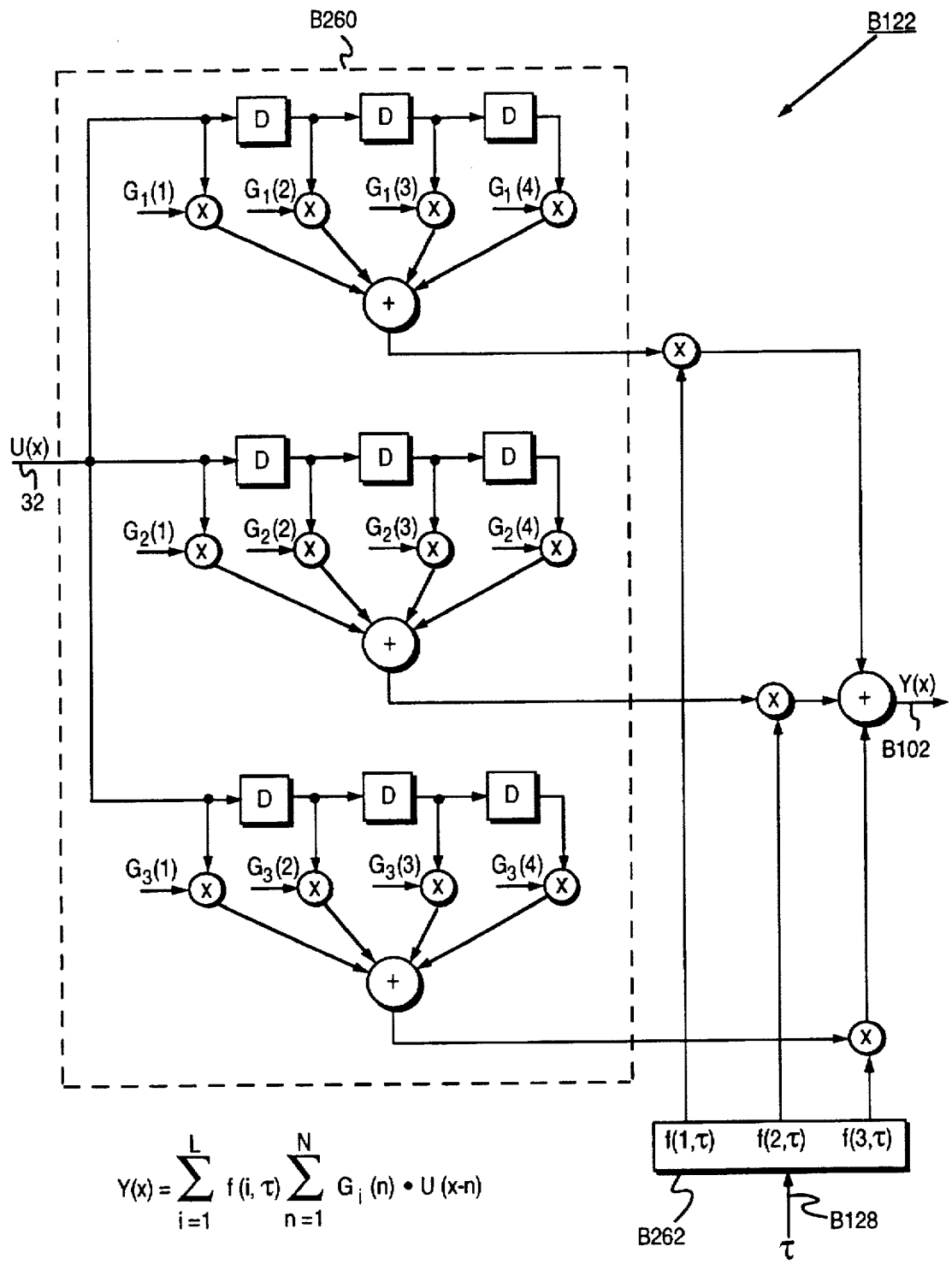
FIG. 7 depicts a cost reduced implementation for the timing recovery interpolator.

The convolution process of the interpolation filter can then be carried out, as shown in FIG. 7, by implementing the $G_{L \times N}$ matrix as a bank of FIR filters B260 connected to receive the channel sample values 32, and the $F_{M \times L}$ matrix implemented as a lookup table B262 indexed by $\tau$ B128 (as will become more apparent in the following discussion). Those skilled in the art will recognize that, in an alternative embodiment, the $A_{M \times N}$ matrix can be factored into more than two matrices (i.e., A≈FGH . . . ).

The preferred method for finding the $F_{M \times L}$ and $G_{L \times N}$ matrices is to minimize the following sum of squared errors:

$$\sum_{j=1}^{M} \sum_{n=1}^{N} (A_{jn} - (F_{M \times L} \cdot G_{L \times N})_{jn})^2 \quad (16)$$

The solution to equation (16) can be derived through a singular value decomposition of the $A_{M \times N}$ matrix, comprising the steps of:

1. performing an SVD on the $A_{M \times N}$ matrix which gives the following unique factorization (assuming M≧N):

$$A_{M \times N} = U_{M \times N} \cdot D_{N \times N} \cdot V_{N \times N} \text{ where:}$$

$U_{M \times N}$ is a M×N unitary matrix;

$D_{N \times N}$ is a N×N diagonal matrix $\{\sigma_1, \sigma_2, \ldots \sigma_N\}$ where $\sigma_i$ are the singular values of $A_{M \times N}$, and $\sigma_1 \geq \sigma_2 \ldots \geq \sigma_N \geq 0$; and $V_{N \times N}$ is a N×N unitary matrix;

2. selecting a predetermined L number of the largest singular values $\sigma$ to generate a reduced size diagonal matrix $D_{L \times L}$:

$$D_{L \times L} = \text{Diag}\{\sigma_1, \sigma_2, \ldots, \sigma_L\} = \begin{bmatrix} \sigma_1 & 0 & \ldots & 0 \\ 0 & \sigma_2 & 0 \ldots & \\ & & & 0 \\ 0 & \ldots & 0 & \sigma_L \end{bmatrix}$$

3. extracting the first L columns from the $U_{M \times N}$ matrix to form a reduced $U_{M \times L}$ matrix:

16

$$U_{M \times L} = \begin{bmatrix} U_{1,1} & \ldots & U_{1,L} & \ldots & U_{1,N} \\ \vdots & & \vdots & & \vdots \\ U_{M,1} & \ldots & U_{M,L} & \ldots & U_{M,N} \end{bmatrix}$$

4. extracting the first L rows from the $V_{N \times N}$ matrix to form a reduced $V_{L \times N}$ matrix:

$$V_{L \times N} = \begin{bmatrix} V_{1,1} & \ldots & V_{1,N} \\ \vdots & & \vdots \\ V_{L,1} & \ldots & V_{L,N} \\ \vdots & & \vdots \\ V_{N,1} & \ldots & V_{N,N} \end{bmatrix}$$

5. defining the $F_{M \times L}$ and $G_{L \times N}$ matrices such that:

$$F_{M \times L} \cdot G_{L \times N} = U_{M \times L} \cdot D_{L \times L} \cdot V_{L \times N} = A_{M \times N}$$

(for example, let $F_{M \times L} = U_{M \times L} \cdot D_{L \times L}$ and $G_{L \times N} = V_{L \times N}$).

In the above cost reduced polynomial and reduced rank matrix embodiments, the interpolation filter coefficients $C_\tau(n)$ are computed in real time as a function of $\tau$; that is, the filter's impulse response h(n) is approximated according to:

$$h(n,\tau) = c_\tau(n) = \sum_{i=1}^{L} G_i(n) \cdot f(i,\tau); \text{ where:} \quad (17)$$

$f(i,\tau)$ is a predetermined function in $\tau$ (e.g., polynomial in $\tau$ or $\tau$ indexes the above $F_{M \times L}$ matrix); L is a degree which determines the accuracy of the approximation (e.g., the order of the polynomial or the column size of the above $F_{M \times L}$ matrix); and $G_i(n)$ is a predetermined matrix (e.g., the coefficients of the polynomial or the above $G_{L \times N}$ matrix). As L increases, the approximated filter coefficients $C_\tau(n)$ of equation (17) tend toward the ideal coefficients derived from equation (15). It follows from equation (17) that the output of the interpolation filter Y(x) can be represented as:

$$Y(x) = \sum_{n=1}^{N} U(x-n) \sum_{i=1}^{L} G_i(n) \cdot f(i,\tau) \quad (18)$$

where U(x) are the channel sample values 32 and N is the number of interpolation filter coefficients $C_\tau(n)$.

Referring again to FIG. 6, the coefficient register file can compute the interpolation filter coefficients $C_\tau(n)$ according to equation (17) and then convolve the coefficients $C_\tau(n)$ with the channel samples U(x) 32 to generate the interpolated sample values B102 synchronized to the baud rate. However, a more efficient implementation of the interpolation filter can be achieved by rearranging equation (18):

$$Y(x) = \sum_{i=1}^{L} f(i,\tau) \sum_{n=1}^{N} G_i(n) \cdot U(x-n) \quad (19)$$

FIG. 7 shows the preferred embodiment of the interpolation filter according to equation (19). In the polynomial embodiment, the function of $\tau$ is a polynomial in $\tau$, and the matrix $G_i(n)$ are the coefficients of the polynomial. And in the reduced rank matrix embodiment, the function of $\tau$ is to index the above $F_{M \times L}$ matrix B262, and the second summation in equation (19), $$\sum_{n=1}^{N} G_i(n) \cdot U(x-n)$$

is implemented as a bank of FIR filters B260 as shown in FIG. 7. Again, in equation (19) L is the depth of the approximation function $f(i,\tau)$ (e.g., the order of the polynomial or the column size of the above $F_{M \times L}$ matrix) and N is the depth of the interpolation filter's impulse response (i.e., the number of coefficients in the impulse response). It has been determined that N=8 and L=3 provides the best performance/cost balance; however, these values may be increased as IC technology progresses and the cost per gate decreases.

Servo Data Demodulation

The servo data in the servo wedges 17 of FIG. 2A is normally recorded at a constant data rate across the zones of the disk. Prior art methods are known for demodulating the servo data and include: asynchronous servo detection by asynchronously sampling the analog pulses and detecting the servo data with a discrete time peak detector; and synchronous servo detection by synchronously sampling the analog pulses and detecting the servo data with the discrete time sequence detector incorporated into the read channel for synchronous detection of user data.

U.S. Pat. No. 5,321,559 entitled "Asynchronous Peak Detection of Information Embedded Within PRML Class IV Sampling Data Detection Channel" discloses an example asynchronous servo detection system, the disclosure of which is hereby incorporated by reference. The general details of the '559 patent are shown in FIG. 1A of this patent, wherein the A/D 24 samples the analog read signal 62 asynchronously at a fixed frequency, the samples are equalized by the discrete equalizer filter 32, and a discrete time peak detector 70 processes the equalized, asynchronous sample values 32 to detect peaks representing the servo data. Similar to the prior art analog peak detection read channels, the data stream is segmented into bit cell periods—the presence of a peak during a bit cell represents a "1" bit and the absence of a peak represents a "0" bit. However, there are problems associated with this asynchronous servo detection scheme. Namely, because the pulses are sampled asynchronously, the servo data must be recorded and detected at a very low data rate for accurate pulse detection and bit cell timing. And for the reasons discussed above, the analog receive filter must be programmed relative to the servo sampling rate in order to attenuate aliasing noise.

A synchronous servo detection system, such as the one disclosed in U.S. Pat. No. 5,384,671 entitled "PRML Sampled Data Channel Synchronous Servo Detector" hereby incorporated by reference, allows for increased servo data rates due to synchronously detecting the pulses which compensates for intersymbol interference and increases immunity to channel noise. The general details of the '671 patent are shown in FIG. 1A of this patent, wherein the timing recovery 28 causes the A/D 24 to sample the analog read signal synchronous to the data rate. The discrete time equalizer filter 26 equalizes the synchronized samples, and a discrete time sequence detector 34, such as a Viterbi detector, detects the servo data. The problem with this synchronous implementation, however, is that timing recovery must synchronize, as close as possible, the sampling rate to the data rate. Errors in timing recovery will quickly degrade the servo detection accuracy. This requires additional overhead in the servo wedges in the form of an acquisition preamble used to synchronize timing recovery before sampling the servo data. Further, synchronous PRML servo detection requires a separate frequency synthesizer to generate a center sampling frequency for timing recovery, as discussed in greater detail in the above referenced U.S. patent application entitled "Sampled Amplitude Read Channel For Reading User Data and Embedded Servo Data From a Magnetic Medium". And for the reasons discussed above, the analog receive filter must be programmed relative to the servo sampling rate in order to attenuate aliasing noise.

The servo demodulation technique of the present invention is shown in FIG. 3. It provides, in a first embodiment, a hybrid of the above mentioned asynchronous peak detection and synchronous PRML detection techniques and, as such, allows for a servo data rate in-between the two. In an alternative embodiment, the present invention provides a synchronous PRML detection scheme similar to the above mentioned prior art except that sampled timing recovery 28 is replaced with interpolated timing recovery B100. Both embodiments replace the programmable analog receive filter 20 with a less complex fixed analog receive filter 20 having a fixed cutoff frequency for attenuating aliasing noise before sampling 24. The read frequency synthesizer 53 clocks the sampling device 24 at the same frequency used for reading the user data sectors 15 (i.e., the sampling rate is not adjusted when reading a servo wedge 17). The equalizer filter 26 equalizes the asynchronous samples 25, and interpolated timing recovery B100 generates synchronized interpolated data B102.

In the hybrid peak detection implementation, the interpolated sample values B102 are only partially synchronized to the frequency of the pulse data, thereby increasing the accuracy of the peak detector 70 and allowing for a higher servo data rate over the prior art asynchronous peak detection technique. Interpolated timing recovery B100 does not synchronize the sample values exactly to the pulse frequency because the peak detector does not compensate for intersymbol interference; that is, the servo data is recorded with sufficient spacing between pulses to avoid intersymbol interference (which can be accomplished by decreasing the data density or through (d,k) RLL encoding/decoding). Since partial synchronization does not significantly degrade how the peak detector performs, it is not necessary for timing recovery to acquire a preamble before reading the servo data.

Alternatively, if the discrete time sequence detector 34 detects the servo data, then interpolated timing recovery B100 synchronizes first to a preamble and then to the servo data. Again, the present invention provides an advantage over the prior art synchronous PRML servo detection systems: it uses an analog receive filter 20 with a fixed, rather than programmable, frequency response, thereby reducing the filter's complexity and cost and improving the yield of the read channel.

In both embodiments of the present invention for servo detection, interpolated timing recovery B100 generates a synchronous data clock B104, discussed in greater detail above, for clocking operation of the discrete time peak detector B70 and the discrete time sequence detector 34.

Although the interpolated timing recovery of the present invention has been disclosed in relation to a d=0 PR4 read channel, the principles disclosed herein are equally applicable to other types of sampled amplitude read channels such as d=1 EPR4 or EEPR4 read channels. In a d=1 read channel, the slicer B141 of FIG. 4A is replaced by a pulse detector as described in the above reference U.S. Pat. No. 5,359,631.

The objects of the invention have been fully realized through the embodiments disclosed herein. Those skilled in the art will appreciate that the aspects of the invention can be achieved through various other embodiments without departing from the spirit and scope of the invention. The particular embodiments disclosed are illustrative and not meant to limit the scope of the invention as appropriately construed by the following claims.

TABLE 1

| Channel | Transfer Function | Dipulse Response |
|---|---|---|
| PR4 | $(1 - D)(1 + D)$ | 0, 1, 0, −1, 0, 0, 0, . . . |
| EPR4 | $(1 - D)(1 + D)^2$ | 0, 1, 1, −1, −1, 0, 0, . . . |
| EEPR4 | $(1 - D)(1 + D)^3$ | 0, 1, 2, 0, −2, −1, 0, . . . |

TABLE B2

| $\tau \cdot 32/Ts$ | C(−2) | C(−2) | C(0) | C(1) | C(2) | C(3) |
|---|---|---|---|---|---|---|
| 0 | 0.0000 | −0.0000 | 1.0000 | 0.0000 | −0.0000 | 0.0000 |
| 1 | 0.0090 | −0.0231 | 0.9965 | 0.0337 | −0.0120 | 0.0068 |
| 2 | 0.0176 | −0.0445 | 0.9901 | 0.0690 | −0.0241 | 0.0135 |
| 3 | 0.0258 | −0.0641 | 0.9808 | 0.1058 | −0.0364 | 0.0202 |
| 4 | 0.0335 | −0.0819 | 0.9686 | 0.1438 | −0.0487 | 0.0268 |
| 5 | 0.0407 | −0.0979 | 0.9536 | 0.1829 | −0.0608 | 0.0331 |
| 6 | 0.0473 | −0.1120 | 0.9359 | 0.2230 | −0.0728 | 0.0393 |
| 7 | 0.0533 | −0.1243 | 0.9155 | 0.2638 | −0.0844 | 0.0451 |
| 8 | 0.0587 | −0.1348 | 0.8926 | 0.3052 | −0.0957 | 0.0506 |
| 9 | 0.0634 | −0.1434 | 0.8674 | 0.3471 | −0.1063 | 0.0556 |
| 10 | 0.0674 | −0.1503 | 0.8398 | 0.3891 | −0.1164 | 0.0603 |
| 11 | 0.0707 | −0.1555 | 0.8101 | 0.4311 | −0.1257 | 0.0644 |
| 12 | 0.0732 | −0.1589 | 0.7784 | 0.4730 | −0.1341 | 0.0680 |
| 13 | 0.0751 | −0.1608 | 0.7448 | 0.5145 | −0.1415 | 0.0710 |
| 14 | 0.0761 | −0.1611 | 0.7096 | 0.5554 | −0.1480 | 0.0734 |
| 15 | 0.0765 | −0.1598 | 0.6728 | 0.5956 | −0.1532 | 0.0751 |
| 16 | 0.0761 | −0.1572 | 0;6348 | 0.6348 | −0.1572 | 0.0761 |
| 17 | 0.0751 | −0.1532 | 0.5956 | 0.6728 | −0.1598 | 0.0765 |
| 18 | 0.0734 | −0.1480 | 0.5554 | 0.7096 | −0.1611 | 0.0761 |
| 19 | 0.0710 | −0;1415 | 0.5145 | 0.7448 | −0.1608 | 0.0751 |
| 20 | 0.0680 | −0.1341 | 0.4730 | 0.7784 | −0.1589 | 0.0732 |
| 21 | 0.0644 | −0.1257 | 0.4311 | 0.8101 | −0.1555 | 0.0707 |
| 22 | 0.0603 | −0.1164 | 0.3891 | 0.8398 | −0.1503 | 0.0674 |
| 23 | 0.0556 | −0.1063 | 0.3471 | 0.8674 | −0.1434 | 0.0634 |
| 24 | 0.0506 | −0.0957 | 0.3052 | 0.8926 | −0.1348 | 0.0587 |
| 25 | 0.0451 | −0.0844 | 0.2638 | 0.9155 | −0.1243 | 0.0533 |
| 26 | 0.0393 | −0.0728 | 0.2230 | 0.9359 | −0.1120 | 0.0473 |
| 27 | 0.0331 | −0.0608 | 0.1829 | 0.9536 | −0.0979 | 0.0407 |
| 28 | 0.0268 | −0.0487 | 0.1438 | 0.9686 | −0.0819 | 0.0335 |
| 29 | 0.0202 | −0.0364 | 0.1058 | 0.9808 | −0.0641 | 0.0258 |
| 30 | 0.0135 | −0.0241 | 0.0690 | 0.9901 | −0.0445 | 0.0176 |
| 31 | 0.0068 | −0.0120 | 0.0337 | 0.9965 | −0.0231 | 0.0090 |

We claim:

1. A sampled amplitude read channel for reading user data and embedded servo data stored on a magnetic disk by detecting digital data from a sequence of discrete time interpolated sample values, the interpolated sample values generated by interpolating a sequence of discrete time channel sample values generated by sampling pulses in an analog read signal from a magnetic read head positioned over the magnetic disk, the sampled amplitude read channel comprising:

(a) a sampling clock;

(b) a sampling device, responsive to the sampling clock, for asynchronously sampling the analog read signal to generate the channel sample values;

(c) interpolated timing recovery, responsive to the channel sample values, for generating the interpolated sample values, wherein the interpolated timing recovery is adjusted on-the-fly to an embedded servo data rate when reading the embedded servo data such that the interpolated sample values are partially synchronized to the embedded servo data rate; and (d) a discrete time pulse detector for detecting the embedded servo data from the interpolated sample values.

2. The sampled amplitude read channel as recited in claim 1, wherein the interpolated timing recovery further generates a data clock for clocking operation of the discrete time detector.

3. The sampled amplitude read channel as recited in claim 1, further comprising a discrete time sequence detector for detecting the user data from the interpolated sample values.

4. The sampled amplitude read channel as recited in claim 3, wherein the interpolated sample values are substantially synchronized to a user data rate when reading the user data.

5. A method for reading user data and embedded servo data stored on a magnetic disk by detecting digital data from a sequence of discrete time interpolated sample values, the interpolated sample values generated by interpolating a sequence of discrete time channel sample values generated by sampling pulses in an analog read signal from a magnetic read head positioned over the magnetic disk, comprising the steps of:

(a) asynchronously sampling the analog read signal to generate the channel sample values;

(b) interpolating the channel sample values to generate interpolated sample values;

(c) adjusting an interpolation filter on-the-fly to an embedded servo data rate when reading the embedded servo data such that the interpolated sample values are partially synchronized to the servo data rate; and (d) detecting the embedded servo data from the interpolated sample values using a discrete time pulse detector.

6. The method for reading embedded servo data as recited in claim 5, wherein the step of interpolating the channel sample values further generates a data clock for use in detecting the embedded servo data from the interpolated sample values.

7. The method for reading embedded servo data as recited in claim 5, further comprising the step of detecting the user data from the interpolated sample values using a discrete time sequence detector.

8. The method for reading embedded servo data as recited in claim 7, wherein the interpolated sample values are substantially synchronized to a user data rate when reading the user data.

* * * * *